E. T. JOHNSSON

Feb. 2, 1932. TEMPERATURE CONTROLLING APPARATUS Re. 18,345

Original Filed March 19, 1926 3 Sheets-Sheet 1

INVENTOR.

BY Emil T. Johnsson, Glenn S. Noble

ATTORNEY.

E. T. JOHNSSON
Feb. 2, 1932. TEMPERATURE CONTROLLING APPARATUS Re. 18,345
3 Sheets-Sheet 2
Original Filed March 19, 1925
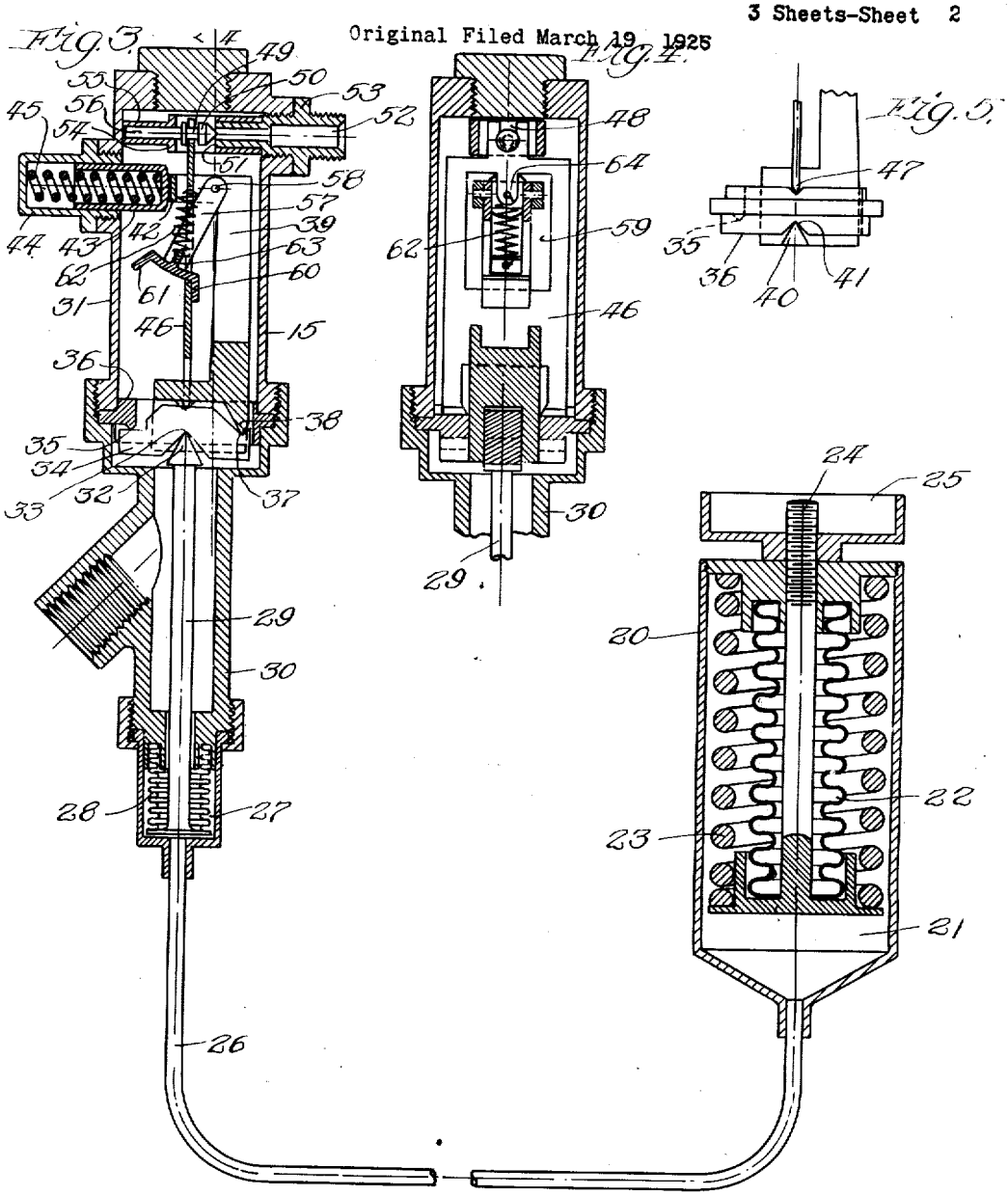
INVENTOR.
BY Emil T. Johnsson,
Glenn S. Noble
ATTORNEY.

E. T. JOHNSSON
Feb. 2, 1932.
TEMPERATURE CONTROLLING APPARATUS
Original Filed March 19, 1926
Re. 18,345
3 Sheets-Sheet 3
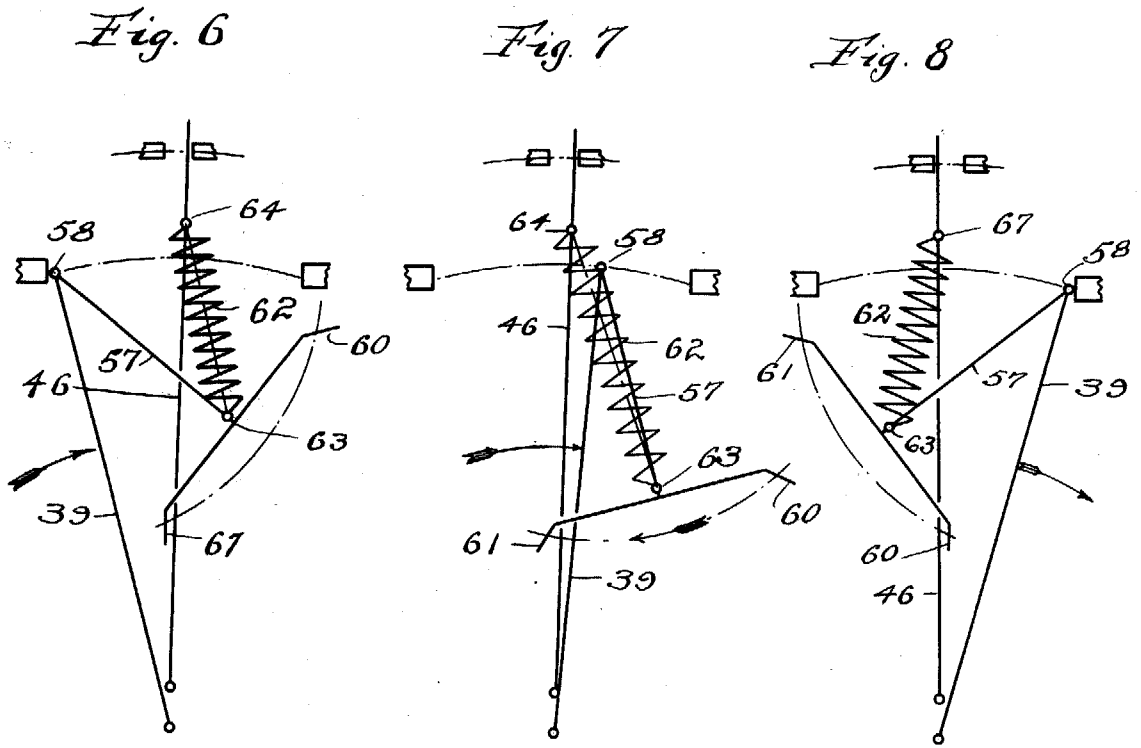
INVENTOR.
BY Emil T. Johnsson,
Glenn S. Noble
ATTORNEY.

Reissued Feb. 2, 1932

Re. 18,345

UNITED STATES PATENT OFFICE

EMIL T. JOHNSSON, OF CHICAGO, ILLINOIS

TEMPERATURE CONTROLLING APPARATUS

Original No. 1,682,227, dated August 28, 1928, Serial No. 95,910, filed March 19, 1926. Reissue No. 17,646, dated April 22, 1930, Serial No. 422,689, filed January 21, 1930. This application for reissue filed November 27, 1931. Serial No. 577,719.

This invention relates to apparatus adapted for controlling temperature, as in connection with heating systems for buildings employing vapor, steam, hot water, or the like, or for regulating the temperature in chambers or receptacles in connection with chemical processes, and to certain tripping or actuating devices which may be used therewith.

The objects of this invention are to provide an improved apparatus for controlling the temperature of a radiator by controlling the heating fluid passing to the same; to provide an automatic temperature control for fluid heating systems; to provide an apparatus of this character which will control the heat through a minimum change in the temperature of the room, that is, to provide means whereby the temperature of a room may be controlled or kept within a very few degrees or small range of variation; to provide means whereby the steam or heating fluid may be utilized for actuating the radiator valve; and to provide such other novel features and improvements in the details of construction, and more particularly in the details of the controlling-valve-operating mechanism and tripping devices which are constructed to operate with a minimum amount of friction, as will be described more fully hereinafter.

In the accompanying drawings illustrating a preferred form of my apparatus:

Figure 3 is a sectional view of the wall thermostat and controlling valve and parts connected therewith;

Figure 4 is a sectional view taken on the line 4—4 of Figure 3;

Figure 5 is a detail illustrating the pivoting of two of the tripping or controlling valve operating members, and Figures 6, 7 and 8 are diagrams illustrating the operation of tripping devices or mechanisms used for actuating the control valve.

Figures 1, 2:
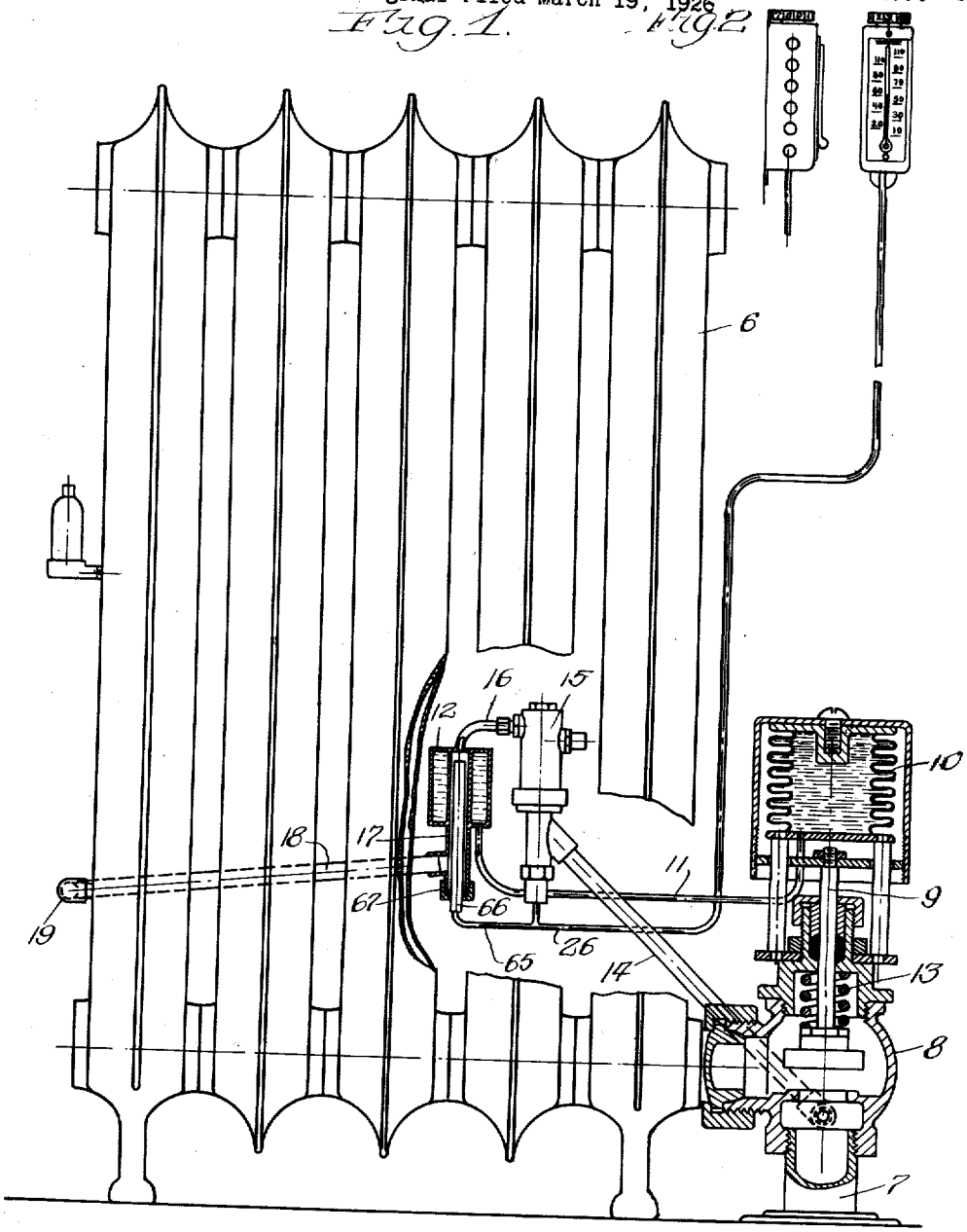
Figure 1 is a side view of a radiator with a controlling apparatus connected therewith, parts being broken away or shown in cross section for convenience in illustration.
Figure 2 is a side view of the wall thermostat, with cover, or casing.

As shown in these drawings, the radiator 6 is provided with a supply pipe 7, this being a single pipe system, although the device may be applied to other types of heating systems. The supply valve 8 has a stem 9 which is actuated by an expansion member 10 for opening and closing the valve, but as this is fully described and shown in my Patent No. 1,720,792, issued July 16, 1929, for Thermostatic temperature regulators, a detailed description is not necessary. A pipe 11 leads from the expansion member 10 to a closed chamber 12 and these parts are filled with any suitable liquid, such as alcohol or oil, or other liquid preferably having a high coefficient of expansion. The arrangement is such that when the liquid in the chamber 12 is heated, it will expand and cause the expansion member 10 to open the valve 8, this valve being held in closed or normal position by means of a spring 13.

The chamber 12 is to be heated at times by means of steam from the main supply for the system, or supply pipe 7 in order to actuate the valve 8. For this purpose, a pipe 14 is connected at one end to the intake pipe 7 or, as shown, to the valve 8 below its seat and at the opposite end is connected with a control valve 15. A pipe or tube 16 leads from the valve 15 to a pipe or passageway 17 which extends through the chamber 12. The pipe 17 is connected by a pipe 18 with the opposite end of the radiator, as shown at 19. The parts are preferably arranged so that the pipes 14 and 18 will pitch downwardly as shown, in order to permit any air therein to flow downwardly into the radiator or supply pipe. The opening from the pipe 18 to the radiator is preferably restricted or comparatively small so that if any steam tends to pass backwardly therethrough, it is apt to be stopped by the water of condensation in the pipe and will therefor not pass up to the heating pipe or tube 17. If a two-pipe system is used, the pipe 18 may lead to the return pipe if desired.

The thermostatically operated control valve 15, and the tripping or actuating devices for operating the same which are shown particularly in Figures 3 to 8, form some of the most important features of this invention. The thermostat 20 may be positioned on the wall as indicated in Figure 1, or located at such position as may be desired in the air or medium in which the temperature is to be controlled. This thermostat comprises a cylinder or body portion 21 which is closed to the atmosphere and which has an expansion member, commonly called a diaphragm 22, mounted therein. This diaphragm is normally held in extended position by a spring 23, but may be shortened or collapsed by means of a bolt 24 and nut 25, as will be readily understood from Figure 3. The cylinder 21 is connected by a pipe 26 with a closed chamber 27 at the end of the valve 15. The cylinder pipe and chamber are filled with any suitable liquid, preferably having a high coefficient of expansion such as alcohol or oil, and care should be used to see that no air remains in these parts. It will be seen that pressure on the liquid or fluid in these parts may be adjusted by adjusting the diaphragm 22.

A diaphragm or bellows 28 is arranged in the chamber 27. The outer end or head of the diaphragm is connected with a pin 29, and the inner end is secured to a tubular extension or cap 30 which is screwed to the body 31 of the controlling valve 15. The upper end of the pin 29 as shown in Figure 3 is provided with a bearing 32, preferably of the knife-edge type which engages with a slot or groove 33 in a lever 34. This lever engages at one end with a fulcrum 35 on a ring 36 which is securely clamped between the body 31 and cap or extension 30. The other end of the lever is provided with a groove 37 which is engaged by a bearing 38 on a bell-crank or angular-shaped lever 39. This lever is provided on either side with bearings 40 by means of which it is fulcrumed in the slots or grooves 41 in the lower side of the ring 36. The upper end of the lever 39 is provided with a branch 42 which engages with a tubular piston 43 which slides in a tubular cap or bearing 44 in the side of the valve body 31. A spring 45 tends to press the tubular piston to the right and consequently to swing the lever 39 in the same direction. A vibrating tongue or arm 46 is pivoted at its lower end in slots or grooves 47 in the ring 36, this end of the tongue being bifurcated in order to straddle the lever 39. The upper end of the tongue is provided with a slot 48 and fits freely in a groove 49 in the plug or valve proper 50 of the controlling valve 15. This plug engages with a seat 51 for controlling the outlet 52 which is connected with the pipe 16. The seat is formed in a threaded connection 53 which is screwed into the valve body, as shown, and which carries a bracket 54 having a bearing 55 for the valve stem 56.

A swinging arm or tappet 57 is pivoted at 58 to the lever 39 and is adapted to actuate with the corresponding portion of the lever through a hole 59 in the vibrating tongue 46. The lower end of the lever is provided with projections 60 and 61 which are adapted to strike or engage at times with the opposite sides of the tongue 46. A spring 62 has one end secured at 63 to the lever 57 and the other end secured at 64 to the tongue 46.

The operation of the tripping or valve controlling mechanism will be readily understood from diagrams in Figures 6, 7 and 8. Figure 6 illustrates the parts in position with the valve closed. When the pressure is reduced on the lever 34 by the pin 29, the lever 39 will be gradually swung to the right. As the pivot 58 passes toward the tongue 46, the spring 62 will be elongated and its tension increased until the pivot passes the tongue. It will be seen that during all of this time, the spring not only tends to pull the projection 61 against the tongue but also tends to hold the upper end of the tongue against the valve plug 50, thereby holding the valve in closed position. As soon as the parts pass the dead center, the spring 62 will pull the lower end of the arm 57 in the opposite direction or toward the left and will cause the point 63 to pass the dead centers of the tongue and the spring will pull the tongue to the left to cause it to snap and open the valve. As the lever 57 continues to swing, the projection 60 will strike the tongue 46 on the right hand side, which will further insure the opening of the valve. It will also be seen that after the parts have moved to open position as shown in Figure 8, the upper end of the spring 62 will then be pulling on the tongue 46 to hold the valve in open position. On account of this quick opening and closing action, the valve will always be either completely closed, and there will be little or no possibility of steam leaking past the same. Furthermore, on account of the snappy action of the arm 57 and the striking of the sides of the tongue, the parts are not apt to stick but will be positively moved at such times as desired.

While the above described arrangement is sufficient for most purposes, I have shown means for providing for a more delicate or closer adjustment whereby the temperature in a room may be regulated through a very narrow range, or within a fraction of a degree. For this purpose, the pipe 26 is provided with a branch 65 which connects with a tube or thermostatic body 66 which is closed at its upper end and extends into the pipe or passageway 17. The lower end of the pipe has a packing or gland 67 for making a tight connection with the tube 66 and for permitting its adjustment, the branch pipe 65 being sufficiently flexible to allow this tube to be raised or lowered in the chamber.

With this explanation of the parts, the operation of the device as a whole may be readily understood. Assuming that the valve 15 is opened and steam is passing through the pipe 14, valve 15, chamber 17 and pipe 18 to the radiator, the liquid in the chamber 12 will be heated and expanded and will cause the expansion member 10 to open the valve 8 as shown in Figure 1, and steam or heating fluid will be supplied to the radiator. As soon as the temperature in the room reaches the predetermined point, the liquid in the thermostat or thermoscope will expand and will exert pressure on the bellows or diaphragm 28. This causes the pin 29 to press against the lever 34 which in turn will swing the lever 39 to the left, and when the arm 57 passes the dead center, the tongue 46 will swing to the right and close the valve 15. As soon as this occurs, the temperature in the chamber 12 will fall rapidly, and as the liquid contracts, the pressure in the expansion chamber 10 will be reduced and the valve 8 will be closed by the spring 13, thereby shutting off the heat to the radiator. When the tube 66 is used, it will be noted that it will be heated to a much higher temperature than the thermoscope. As the tube 65 is comparatively small, this heat will not be transmitted to the thermoscope or other parts connected therewith. As soon as the steam is cut off from the chamber 17, there will be a rapid fall in the temperature of the tube 66, and by properly proportioning and adjusting this member a change in pressure produced therein may be utilized for controlling the pressure in the chamber 27 whereby a less variation will be necessary in pressure from the thermoscope so that the thermoscope may be adjusted to regulate the temperature of the room within a fraction of a degree. In other words, when the steam reaches the chamber 17, the pressure produced in the tube 66 will be added to the pressure which will be later created in the thermoscope and the valve may be closed more promptly than if the pressure of the thermoscope alone were relied upon.

It will, of course, be apparent that my apparatus may be located in any suitable manner and the parts may be changed or arranged differently for different conditions, and therefore I do not wish to be limited to the exact arrangement herein shown and described, except as specified in the following claims.

I claim as my invention:

1. In an apparatus of the character set forth, the combination of a heat exchange member, a supply for said member, a supply valve, an expansion member for opening said valve, a chamber connected with said expansion member but remote therefrom, liquid in said chamber and expansion member, a passageway from the supply through the chamber to the heat exchange member for supplying heat to said chamber, a valve for controlling said heat supply to the chamber, and thermostatic means for actuating said valve.

2. In a heat controlling apparatus, the combination of a radiator having a supply pipe, a supply valve for said pipe, a spring tending to hold the valve in closed position, an expansion member for opening the valve, a chamber, a pipe connecting the chamber with the expansion member, liquid in said chamber, pipe and expansion member, a passageway through said chamber, a pipe leading from the supply pipe to the passageway, a valve for controlling the passage through said pipe, a connection from the passageway to the radiator, means for opening and closing the last-named valve and thermostatic means for actuating said opening and closing means.

3. A controlling device comprising a body having an outlet, a movable valve plug for controlling said outlet, a vibrating tongue for moving said plug, a lever pivoted in the body, means for swinging said lever, an arm pivoted to said lever at a point so that the pivot will pass the tongue when the lever is swung, a tension spring between the tongue and arm for swinging the arm and tongue, said arm being provided with projections adapted to engage with either side of the tongue when the arm is swung past dead center.

4. A controlling valve comprising a body having an outlet, a valve member for opening and closing the outlet, a tongue for actuating said member, a lever, a spring tending to hold said lever in normal position, an arm pivoted to the lever, an overflow spring between the arm and tongue, projections on said arm for engagement with the sides of the tongue when the arm is swung by the spring, and means for swinging said lever, the arrangement being such that when the lever is swung a predetermined distance, the pivot for the arm will pass a dead center and the spring will swing the arm and tongue for actuating the valve.

5. A controlling valve comprising a body, a pressure chamber at one end of the valve, a bellows mounted in said chamber, a pin actuated by said bellows, a lever engaged by said pin, a bell crank lever actuated by said lever, a spring tending to hold the bell crank lever in normal position, an arm pivoted to the bell crank lever and having projections at its free end, a tongue pivoted in the valve body, a closure actuated by said tongue for closing the valve outlet, and a spring secured to the tongue and arm, the arrangement being such that when the arm pivot passes the tongue the spring will swing the arm and tongue, substantially as described.

6. In an apparatus of the character set forth, the combination of a thermostat comprising a closed cylinder, an adjustable diaphragm in said cylinder, a controlling valve, a chamber at one end of said valve, a pipe leading from the cylinder to the chamber, liquid in said cylinder pipe and chamber, a bellows mounted in said chamber, a pin connected with said bellows and adapted to be reciprocated thereby, a lever engaging said pin, a bell crank lever engaging with the first-named lever, a spring tending to hold the bell crank lever in normal position, a valve, a pivoted tongue for actuating said valve, and a spring-actuated overthrow arm connected with the bell crank lever and tongue for swinging the tongue to open and close the valve.

7. The combination with a radiator, of a supply pipe, an inlet valve, a spring tending to close said valve, an expansion member for opening the valve, a chamber connected with said expansion member and having fluid therein, a passageway through said chamber, a connection from the supply pipe to said passageway, a controlling valve for regulating the steam through said passageway, a connection from the passageway to the radiator, a thermostat connected with said control valve, and an adjustable tube in said passageway also connected with the control valve and adapted to coact with the thermostat for actuating said valve.

8. A valve construction comprising a body having an outlet at one end thereof, a cap threaded to the opposite end, a ring mounted between the cap and body, a closed chamber at the outer end of the cap, a bellows mounted in said chamber and adapted to be compressed by pressure in the chamber, a pin secured to the bellows and projecting through the cap, a lever pivoted on said ring and engaging with said pin, a bell crank lever also pivoted on the ring and having a bearing engaging with the first-named lever, a spring tending to hold the bell crank lever in normal position against the pressure of the bellows, a tongue pivoted to said ring and extending over the bell crank lever, a valve member actuated by said tongue, an arm pivoted on the lever and having projections adapted to strike on either side of the tongue, and a spring between the arm and tongue, the arrangement being such that when the pivot of the arm passes the tongue in either direction, the spring will operate to swing the arm and tongue, substantially as described.

9. In an apparatus of the character set forth, a control valve for controlling the passage of heating fluid, a liquid thermostat for operating said control valve, a secondary thermostatic body connected with the first-named thermostat, said body being positioned so that it is subjected to the action of the heating fluid passing through said control valve.

10. The combination of a main lever, means for operating said lever, a secondary lever pivoted to said main lever, a vibrating tongue, a spring connected with said secondary lever and said tongue, said levers being so arranged that a movement of the main lever will swing the pivot of the secondary lever and cause the secondary lever to be tripped by said spring which in turn will actuate the vibrating tongue, the path of movement of the connection between said spring and secondary lever being located in a zone intermediate the pivotal axis of said main lever and the path of movement of the pivotal axis of said secondary lever.

11. The combination of a main lever, means for operating said lever, a secondary lever pivoted to said lever, a vibrating tongue, a spring connected with said secondary lever and said tongue, said levers being so arranged that a movement of the main lever will swing the pivot of the secondary lever and cause the secondary lever to be tripped by said spring and strike the vibrating tongue and also to permit the spring to swing said tongue, the path of movement of the connection between said spring and secondary lever being located in a zone intermediate the pivotal axis of said main lever and the path of movement of the pivotal axis of said secondary lever.

12. In a trip mechanism, a lever to be tripped, said lever being actuated by a second lever which, while it is in motion, displaces the fulcrum of a spring connecting the swinging ends of both levers thereby causing said first lever to be tripped, said secondary lever also striking a hammer blow on the first lever.

13. The combination with a pivoted lever to be tripped, of an arm having a movable pivot, a spring connecting the free end of the arm and the free end of the lever, means for moving the pivot of the arm under predetermined conditions and means carried by the arm for striking the lever when the arm swings to trip the lever.

14. In a controlling apparatus, a main lever 39 adapted to vibrate through a given arc, an arm 57 pivoted to the free end of said lever, a lever 46 which is to be swung, a spring connecting the free end of the arm and the free end of the last-named lever and adapted to swing the last-named lever when the pivot of the arm passes dead center, and means carried by the arm for striking the last-named lever as the arm reaches the limit of its movement.

15. In a trip mechanism, a lever to be tripped, said lever being actuated by a second lever fulcrumed to a third lever, the arrangement being such that a movement of the third lever will swing the pivot of the second lever thereby displacing the fulcrum of a spring which is connected between the free ends of the first and second named levers and causing said second lever to swing and displace the fulcrum of the spring relative to the first lever causing said first lever to be tripped and also to strike a hammer blow on said first lever.

16. The combination with a pivoted lever to be tripped, of an arm having a movable pivot, a spring connecting the free end of the arm and the free end of the lever, means for moving the pivot of the arm under predetermined conditions and means coacting with the arm and lever for stopping the arm.

17. The combination of a main lever, means for operating said lever, a secondary lever pivoted to said main lever, a vibrating tongue, a spring connected with said secondary lever and said tongue, said levers being so arranged that a movement of the main lever will swing the pivot of the secondary lever and cause the secondary lever to be tripped by said spring which in turn will actuate the vibrating tongue, said secondary lever having stop members thereon so positioned that when said lever is at the limit of its movement in either direction, one of said members will engage a coacting stop positioned at substantially the center of oscillation.

18. The combination of a main lever member, a pivoted tongue member, a secondary lever pivoted to one of said members, a spring connected with said secondary lever and with the other of said members, said levers being so arranged that a movement of the main lever will cause the secondary lever to be tripped by said spring which in turn will actuate the tongue member, the path of movement of the connection between said spring and secondary lever being located in a zone intermediate the pivotal axis of a certain of said members and the path of movement of the pivotal axis of said secondary lever.

EMIL T. JOHNSSON.

CERTIFICATE OF CORRECTION.

Reissue of Reissue Patent No. 18,345. Granted February 2, 1932, to

EMIL T. JOHNSSON.

It is hereby certified that error appears in the printed specification of the above numbered patent requiring correction as follows: Page 2, line 108, before the word "closed" insert the words open or completely; and that the said Letters Patent should be read with this correction therein that the same may conform to the record of the case in the Patent Office.

Signed and sealed this 5th day of April, A. D. 1932.

(Seal)

M. J. Moore,
Acting Commissioner of Patents.